United States Patent
Serravalle

(10) Patent No.: US 9,723,503 B2
(45) Date of Patent: Aug. 1, 2017

(54) COMMUNICATIONS SYSTEM

(75) Inventor: Francesca Serravalle, London (GB)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 12/735,616

(22) PCT Filed: Jan. 30, 2009

(86) PCT No.: PCT/JP2009/052009
§ 371 (c)(1),
(2), (4) Date: Aug. 3, 2010

(87) PCT Pub. No.: WO2009/099162
PCT Pub. Date: Aug. 13, 2009

(65) Prior Publication Data
US 2010/0317349 A1 Dec. 16, 2010

(30) Foreign Application Priority Data

Feb. 4, 2008 (GB) .................................. 0802021.6

(51) Int. Cl.
H04W 36/00 (2009.01)
H04W 24/10 (2009.01)
(Continued)

(52) U.S. Cl.
CPC ........ *H04W 24/10* (2013.01); *H04W 36/0083* (2013.01); *H04W 48/20* (2013.01); *H04W 60/00* (2013.01)

(58) Field of Classification Search
CPC . H04W 24/10; H04W 48/20; H04W 36/0083; H04W 60/00
(Continued)

(56) References Cited

U.S. PATENT DOCUMENTS 7,072,674 B1 * 7/2006 Mademann .................. 455/458
7,376,423 B2 5/2008 Sakanaba
(Continued)

FOREIGN PATENT DOCUMENTS

CN 1422082 6/2003
EP 1 838 122 A1 9/2007
(Continued)

OTHER PUBLICATIONS

Vodafone Group, T-Mobile, "Initial Standardisation Requirements from Self-Organizing Networks", 3GPP TSG RAN WG2#58, Kobe, Japan, May 7-11, 2007, R2-072077.
(Continued)

*Primary Examiner* — Ajit Patel
(74) *Attorney, Agent, or Firm* — Finnegan, Henderson, Farabow, Garrett & Dunner, L.L.P.

(57) ABSTRACT

A user communications device having active and idle states operates in a cellular communications network in which user communications devices communicate via network communications devices of cells of the network. History data identifying the cells in which the user communications device has been present whilst in the idle state is maintained. This history data is used by the user communications device or by a network communications device to enable adjustment of cell selection/reselection parameters for the user communications device in the active state.

47 Claims, 10 Drawing Sheets

(51) Int. Cl.
*H04W 60/00* (2009.01)
*H04W 48/20* (2009.01)

(58) Field of Classification Search
USPC ............. 455/403, 404.1, 404.2, 422.1,
455/456.1–456.6, 440
See application file for complete search history.

(56) References Cited

U.S. PATENT DOCUMENTS

| | | | |
|---|---|---|---|
| 8,260,297 B2 * | 9/2012 | Jeong et al. | 455/436 |
| 2003/0050076 A1 * | 3/2003 | Watanabe | 455/456 |
| 2003/0143999 A1 * | 7/2003 | Funato et al. | 455/435 |
| 2004/0203769 A1 | 10/2004 | Sakanaba | |
| 2004/0240392 A1 * | 12/2004 | Han | 370/252 |
| 2007/0081455 A1 * | 4/2007 | Kashima et al. | 370/229 |
| 2008/0039093 A1 * | 2/2008 | Sohn | 455/436 |
| 2008/0218209 A1 | 9/2008 | Lee et al. | |
| 2011/0026462 A1 * | 2/2011 | Montojo et al. | 370/328 |
| 2013/0150035 A1 * | 6/2013 | Chande et al. | 455/435.1 |

FOREIGN PATENT DOCUMENTS

| | | |
|---|---|---|
| EP | 1 863 227 A1 | 12/2007 |
| GB | 2 434 507 A | 7/2007 |
| JP | 2003-186900 A | 7/2003 |
| JP | 2006-331048 A | 12/2006 |
| JP | 2007-213207 A | 8/2007 |
| KR | 10-2001-0098006 | 11/2001 |
| KR | 2002-0039483 | 5/2002 |
| KR | 2006-0023937 | 3/2006 |
| KR | 10-2007-0108830 A | 11/2007 |
| WO | WO 2007/088381 A1 | 8/2007 |
| WO | WO 2008/020280 A1 | 2/2008 |

OTHER PUBLICATIONS

Korean Office Action dated Mar. 20, 2012, with English translation.
Japanese Office Action dated Feb. 27, 2013 with a partial English translation.
Korean Office Action dated Jun. 23, 2014 with an English translation.
Korean Office Action dated Oct. 31, 2013 with a partial English translation.
Office Action and Search Report mailed Nov. 15, 2014, by the Chinese Patent Office in counterpart Chinese Patent Application No. 200980104043.1
Communication Pursuant to Article 94(3) EPC mailed on Oct. 6, 2016, by the European Patent Office in counterpart European Patent Application No. 09 708 914.8.

\* cited by examiner

COMMUNICATIONS SYSTEM

TECHNICAL FIELD

The present invention relates to mobile telecommunications networks, particularly but not exclusively networks operating according to the 3GPP standards or equivalents or derivatives thereof.

BACKGROUND ART

Mobile telecommunications networks enable users of User Equipment (UE) to communicate with other such users via one of a number of base stations (eNodeB, eNB) and a core network 7. Each base station defines a number of cells of the network. In an active state a UE is registered with the network and has an RRC (Radio Resource Control) with a base station so that the network knows which cell the UE belongs to and can transmit data to and receive data from the UE. In LTE, in the Active state, the Handover procedure allows UEs to have service continuity while moving within the Intra LTE system (Intra and Inter Frequency) and towards other RATS (Radio Access Technologies). A UE at or near a border region between cells may move back and forth ("ping pong") between cells and may as a consequence generate an excessive number of requests for reconnection to different base stations.

A UE also has a power conservation or idle state in which, typically, the UE is not transmitting or receiving data and no context about the UE is stored by the base station. In the idle state the location of the UE is known only (to the MME (Mobility Management Entity) in 3GPP) at the granularity of a Tracking Area (TA) comprising a cluster or group of base station cells.

When in the idle state, a UE selects and reselects cells according to the parameters broadcasted in the BCH (Broadcast Channel) and the base station is not aware of the cell selections/reselections made by the UE.

A wrong setting of the cell selection/reselection parameters may cause the UE to ping pong between the cells which may be harmful in terms of both signalling, processing and resource utilization.

For example, if the cell selection/reselection parameters are not properly set, then a Handover procedure may be performed as soon as the UE enters the Active state. A Tracking Area Update may also be performed if the UE is at Tracking Area border and the new Tracking Area is not in the list of TAs the UE is registered with.

Furthermore, ping-pong in idle state or mode may cause:
Paging messages to be lost during cell reselections, especially for inter-freq/inter-RAT cell selection/reselection
Higher battery consumption in the UE because of repeated inter-freq/inter-RAT measurements
Service interruption if the ping-pong results in a cell selection procedure being performed.

DISCLOSURE OF INVENTION

According to one aspect, the present invention provides a method performed by a user communications device of a cellular communications network in which user communications devices communicate via network communications devices of cells of the network, the method comprising the user communications device: maintaining history data relating to the location (cell and/or tracking area) of the cellular communications network in the idle state; and providing data relating to the history data to a network communications device.

The history data may identify the last n cells in which the user communications device has been present (camped in), where n may be, for example, five. The history data may identify the time for which the user communications device was present in each cell.

The history data may be used to detect at least one of ping pong between cells and ping pong between tracking areas (TAs).

The user communications device may provide the history data to a network communications device at any appropriate time, for example at at least one of:
entry into the active state, for example in the RRC Initial Direct Transfer or in any other RRC messages involved in the idle to Active transition procedure in response to detection of ping pong between cells and/or or TAs.

The user communications device may check whether the tracking area of the cell in which it is present is different from the tracking area of the last cell in which it was present, before providing the cell history data, if the purpose is to identify ping pong only between tracking areas and may provide the history data to a network communications device only if the tracking areas are different, thereby enabling ping pong between TAs to be addressed by adjustment of cell selection/reselection parameters.

The user communications device may check whether it is in a high mobility state (which may arise if, for example, the user is in a moving vehicle) before providing the cell history data and may only send the history data if it is not a high mobility state, thereby enabling differentiation between ping pong due to incorrect setting of cell selection/reselection parameters and ping pong caused by high mobility of the user communications device.

As another possibility or additionally, in the active state the user communications device may provide the cell history data in response to a request from a network communications device. This enables the network communications device to control the amount of signalling needed and the amount of data collected.

Another aspect of the invention provides a method performed by a network communications device of a cellular communications network in which user communications devices communicate via network communications devices of cells of the network, the method comprising the network communications device receiving from a user communications device cell data relating to history data relating to the location of the cellular communications network in the idle mode. This enables the cell selection/reselection parameters provided to the affected cells in the BCH to be checked and adjusted if necessary to reduce the possibility of ping pong between at least one of cells and TAs.

In an embodiment, a user communications device having active and idle states operates in a cellular communications network in which user communications devices communicate via network communications devices of cells of the network. History data identifying the cells and TAs in which the user communications device has been present whilst in the idle state is maintained. This history data is used by the user communications device or by a network communications device to enable adjustment of cell selection/reselection parameters in the affected cells.

The user communications device may initiate provision of the data relating to the history data, in which case the user communications device may provide the actual history data or data indicating the existence of ping pong between cells and/or TAs. As another possibility, the network communications device may request a user communications device to provide its history data as, for example, a response to the Communication Network Request message.

The present invention may be applied to, for example:
Intra LTE Infra Frequency cell selection/reselection
Intra LTE Inter Frequency cell selection/reselection
Inter system cell selection/reselection The invention also provides, for all methods disclosed, corresponding computer programs or computer program products for execution on corresponding user communications devices or network communications devices. The invention also provides user communications devices and network communications devices configured or operable to implement the methods and components thereof and methods of updating these.

Embodiments of the invention will now be described, by way of example, with reference to the accompanying drawings, in which:

BEST MODE FOR CARRYING OUT THE INVENTION

Overview

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hardwired elements, software elements or firmware elements or any combination of these.

Figure 1:
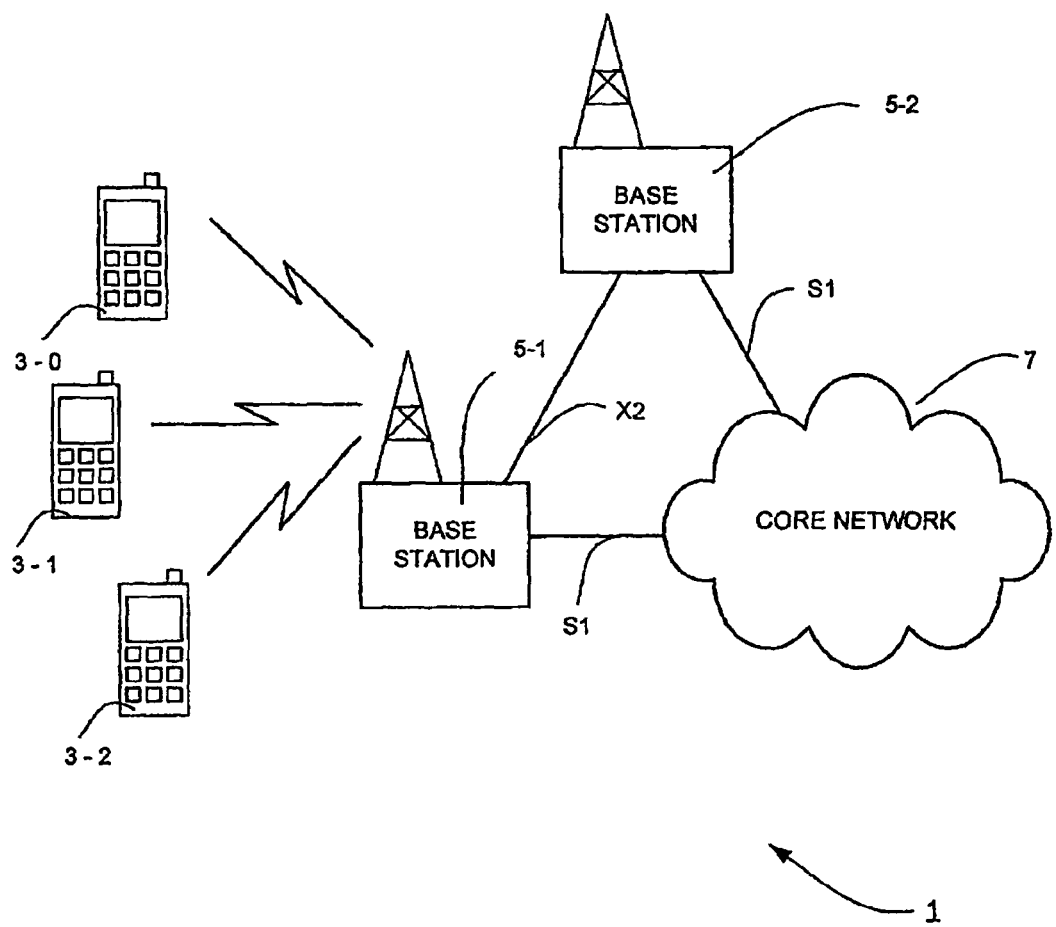
FIG. 1 illustrates schematically a cellular telecommunications system to which embodiments of the invention may be applied.

FIG. 1 illustrates schematically a mobile (cellular) telecommunications system 1 in which a user of a user communications device (User Equipment (UE)) 3 in the form of a mobile (cellular) telephone or other mobile device capable of communicating over a mobile telecommunications network can communicate with other users (not shown) via one of a number of network communications devices, referred to herein in as base stations or nodes (eNodeB or eNB, in the example of E_UTRAN) 5 and a core network 7. For simplicity in the diagram only three UEs 3-0, 3-1 and 3-2 and two base stations 5-1 and 5-2 are shown, although it will be appreciated that the system will generally have many more.

The mobile (cellular) telecommunications system 1 may operate according to the 3GPP standards or equivalents or derivatives thereof or any other appropriate cellular telecommunications standard or standards.

Figure 2:
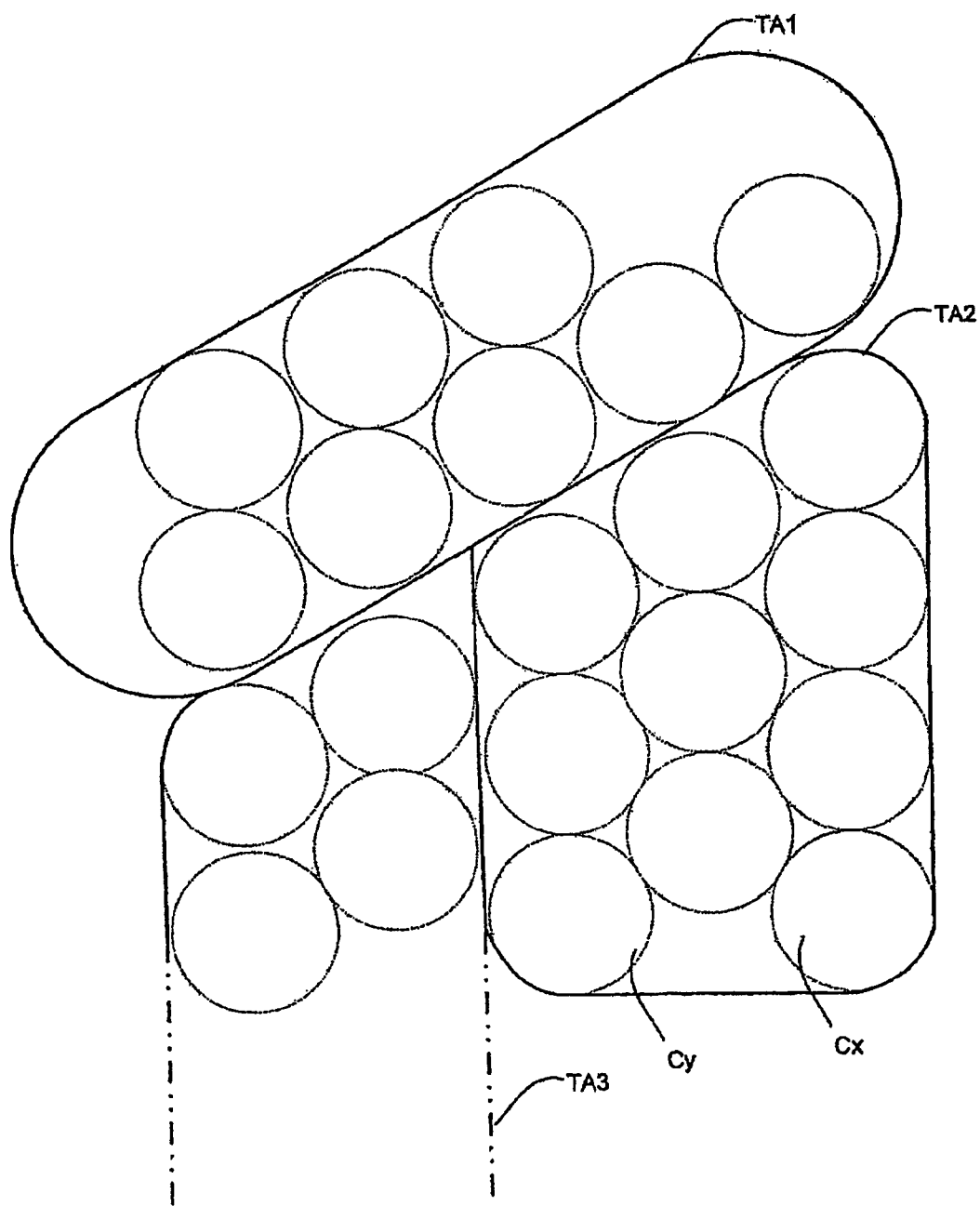
FIG. 2 illustrates very diagrammatically the relationship between cells and tracking areas of a cellular telecommunications system.

Each base station defines a number of cells of the network and the cells are separated into groups or clusters known as tracking areas (TAs). FIG. 2 shows, very diagrammatically, two tracking areas TA1 and TA2 plus part of another tracking area TA3, each formed of cells C, with, as an example, cells Cy and Cx being in tracking area TA2. It will be appreciated that the cells and tracking areas may not have the shapes shown in FIG. 2 and that adjacent cells and/or tracking areas may or may not overlap.

UEs of such a mobile (cellular) telecommunications system have active and idle modes or states. In the active state a UE is registered with the network and has an RRC (Radio Resource Control) with a base station so that the network knows which cell the UE belongs to and can transmit data to and receive data from the UE. In LTE, a handover procedure allows UEs to have service continuity while moving within the Intra LTE system (Intra and Inter Frequency) and towards other RATS (Radio Access Technologies).

The idle state is a power conservation idle state in which, typically, the UE is not transmitting or receiving data and no context about the UE is stored by the base station. Rather, in the idle state the location of the UE is known only to functionality of the core network, for example to the MME (Mobility Management Entity) in 3GPP, and only at the resolution or granularity of a Tracking Area (for example TA1, TA2, or TA3 in FIG. 2).

When in the idle state, a UE selects and reselects cells according to the parameters broadcasted in the BCH (Broadcast Channel) and may also perform a tracking area update if it is at tracking area border and the tracking area into which it is moving is not in the list of TAs the UE is registered with.

A UE embodying the invention is configured to maintain history data relating to the cells and TAs of the cellular communications network in which it has been present (camped) while in the idle mode or state and to provide data related to such history data to a network communications device in order to enable a determination to be made as to whether any adjustment of its cell selection/reselection parameters is required to avoid or at least reduce the possibility of ping pong between cells and/or TAs.

UE

Figure 3:
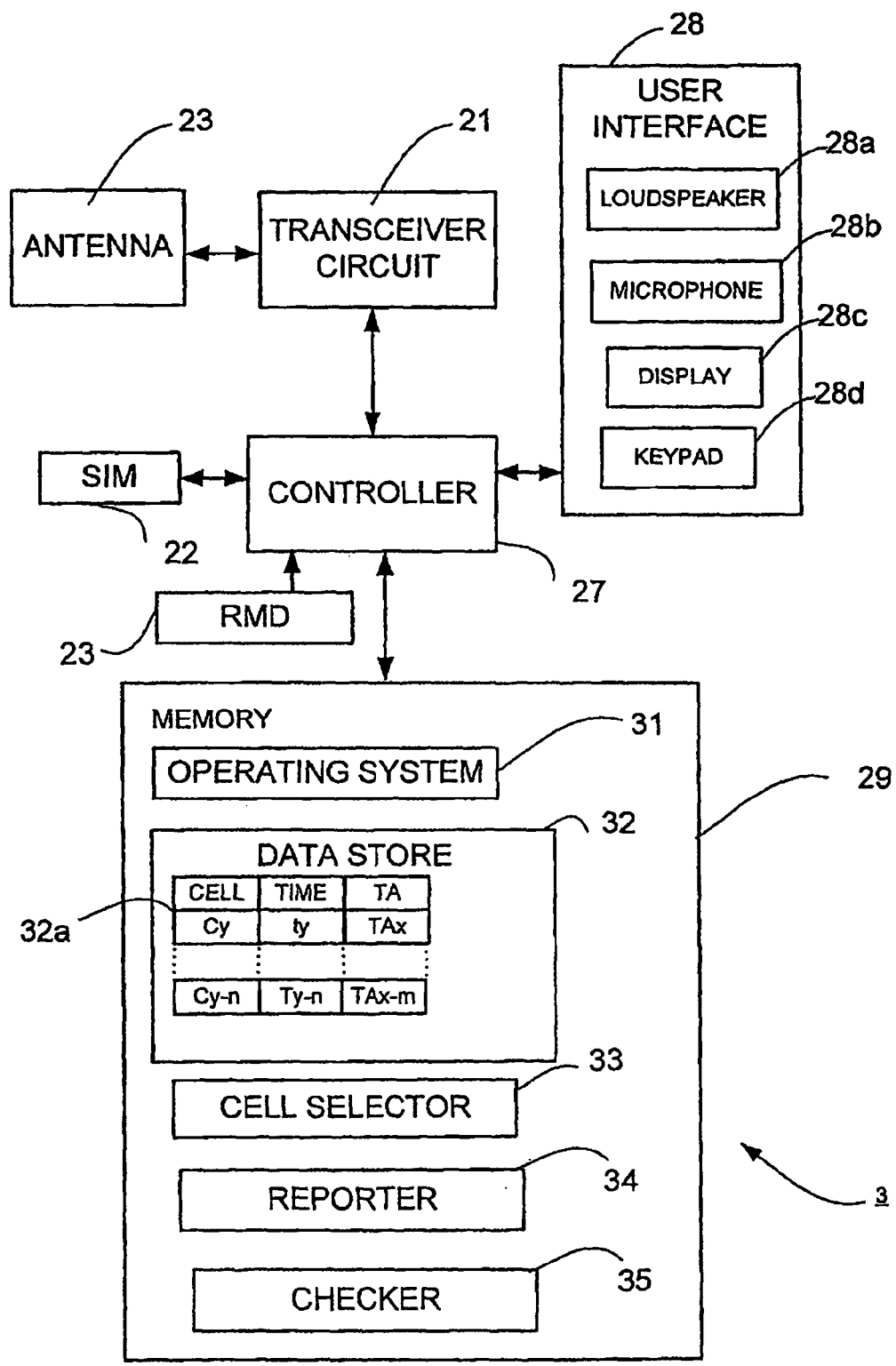
FIG. 3 illustrates a functional block diagram to show some of the functionality of a user communications device.

FIG. 3 shows a functional block diagram of a UE 3 shown in FIG. 1. As shown, the UE 3 has a transceiver circuit 21 that is operable to transmit signals to and to receive signals from a base station 5 via one or more antenna 23. The UE 3 has a controller 27 to control the operation of the UE 3 and a SIM (Subscriber Identity Module). The controller 27 is associated with a memory 29 and is coupled to the transceiver circuit 21 and to a user interface 28 having a loudspeaker 28a, a microphone 28b, a display 28c, and a keypad 28d. Although not necessarily shown in FIG. 3, the UE will of course have all the usual functionality of a cellular telephone and this may be provided by any one or any combination of hardware, software and firmware, as appropriate. Software may be pre-installed in the memory and/or may be downloaded via the telecommunications network or from a removable data storage device (RMD) 23, for example.

The controller 27 is configured to control overall operation of the UE by, in this example, program instructions or software instructions stored within memory 29. As shown, these software instructions include, among other things, an operating system 31, a cell selector/reselector 33 to enable selection and reselection of cells in accordance with cell selection/reselection parameters provided by the BCH, and a reporter 34 to report to a base station data relating to the cells within which the UE has been camped or present while in the idle state. The memory 29 also provides a data store 32 associated with the reporter 34 to store cell history data 32a identifying the last n cells Cy to Cy-n within which the UE has been camped or present while in the idle state, the Tracking Area of those cells and the time ty to ty-n for which the UE was present in each of those cells. The data store 32 may be configured to store data for the last 5 cells, although the data store 32 may store data for fewer or more cells. The UE also has a checker 35 to check for a high mobility state and to check the TA status. It will of course be appreciated that, particularly where ping pong is occurring, the same cell and/or the same TA may be present more than once in the stored history data.

Base Station

Figure 4:
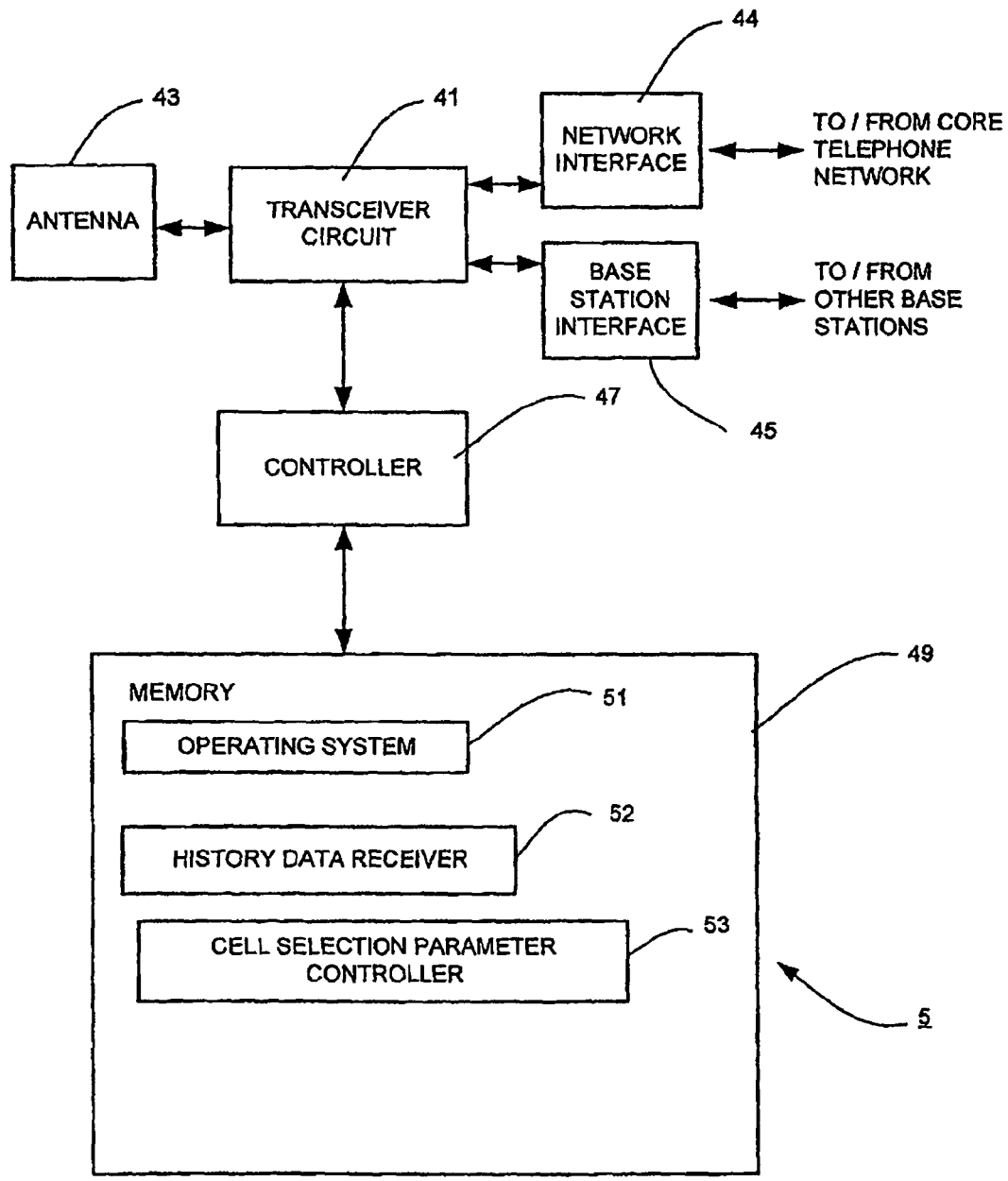
FIG. 4 illustrates a functional block diagram to show some of the functionality of a network communications device.

FIG. 4 shows a functional block diagram of a base station 5 shown in FIG. 1. As shown, the base station 3 has a transceiver circuit 41 to transmit signals to and to receive signals from the UEs 3 via one or more antenna 43, a network interface 44 to transmit signals to and receive signals from the core network 7 and a base station interface 45 to transmit signals to and to receive signals from other base stations 5. The base station 5 has a controller 47 to control the operation of the base station. The controller 47 is associated with a memory 49. Although not necessarily shown in FIG. 4, the base station will of course have all the usual functionality of a cellular telephone network base station and this may be provided by any one or any combination of hardware, software and firmware, as appropriate. Software may be pre-installed in the memory and/or may be downloaded via the telecommunications network or from a removable data storage device (RMD), for example.

The controller 47 is configured to control overall operation of the base station by, in this example, program instructions or software instructions stored within memory 49. As shown, these software instructions include, among other things, an operating system 51, a cell selection/reselection parameter controller 53 to enable the parameters by which a UE selects/reselects a cell to be adjusted and a history data receiver 52 to receive data relating to history data provided by a reporter 34 of a UE.

In the above description, the base station 5 and the UEs 3 are described for ease of understanding as having a number of discrete functional components or modules (such as the history data receiver, cell selection parameter controller, cell selector, reporter, data store). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In operation of the system described above, when in idle or inactive state, the cell selector 33 of a UE selects and reselects cells according to the parameters broadcasted in the BCH (Broadcast Channel).

Each time the UE reselects a cell, the reporter 34 updates the cell history data 32a to add the new cell as the nth cell, logs the time at which the UE switched to that cell and stores the total time for which the UE was in the previous cell. The TA of the reselected cell may also be added as shown in FIG. 3.

If the cell history data already has n entries, then the reporter 34 removes the oldest entry so that the cell UE maintains a list of the last n cells in which it was camped and the time for which it was camped in each of those cells. The same cell may of course appear more than once in the list.

The reporter may store and so report RAT information and frequency information together with cell identification data and time.

The UE reports data relating to the history data to the base station of the cell in which it is next in the active state. The reporter 34 of the UE may, for example, report the actual history data to a base station the next time it enters the active state or sometime whilst it is in the active state. As another possibility, to reduce the data traffic and signalling, the reporter 34 may check the history data to determine, in accordance with a ping pong detection algorithm, whether or not ping pong is present in the history data and only report when ping pong is detected. In this case, the reporter 34 may report to a base station the next time it enters the active state the actual history data (so that the base station can make its own identification of ping pong) or the fact that ping pong has occurred and the identity of the cells and/or TAs involved in the ping pong. As an example, a UE may determine that ping pong is occurring if the entries in the cell history alternate between two cells (and optionally TAs whenever the cells affected by ping-pong belongs to different TAs) within a predetermined time period. The reporter of the UE may, before reporting history data to a base station, check whether or not the UE is in a high mobility state (that is the UE is moving very quickly, for example the user is travelling in a vehicle) and, if so, may decide not to report the history data. As another possibility or additionally, a base station may request history data when a UE is already in the active state.

Upon receipt of the data relating to the history data (the actual history data or ping pong detection data) by the history data receiver 52 of a base station, the cell selection parameter controller 53 determines whether or not adjustment needs to be made to the cell selection parameters provided to the UE in the BCH. Other measurement from other UES may be taken into account for that purpose. Where the received data is the actual history data, the bases station uses a ping pong detection algorithm to determine whether ping pong has occurred. For example, if the received data indicates that ping pong is occurring, then the base station cell selection parameter controller 53 will cause the cell selection parameters in the BCH for that UE to be altered. This may be done by alerting the operator who can then change the cell selection parameters manually via the Operations and Management (O&M) system. As another possibility, the cell selection parameters may be changed automatically in accordance with an algorithm which may be implementation specific.

The base station generally provides the cell selection/reselection parameter data in the BCH for its cell rather than for a specific UE so that any UE in that cell will receive the same cell selection/reselection parameter data. The base station may consider history or other data from other UEs in the same cell when providing the cell selection/reselection parameter data.

The embodiments described above enable a network to detect cases of frequent idle mode or state cell selection/reselection between neighbouring cells so that this can be corrected. This may be carried out during any cell selection/reselection process the cell selector may carry out, for example: Intra LTE Intra Frequency cell selection/reselection; Intra LTE Inter Frequency cell selection/reselection; Inter system cell selection/reselection.

In the case of intra LTE intra frequency cell selection/reselection, the UE, while moving, will reselect a new cell on the base of the cell reselection criteria broadcast in the BCH channel. The data reporting described above enables the cell selection reselection parameters to be adjusted so that they are properly set, may avoid a handover procedure being performed as soon as the UE enters the Active state and may also avoid the performing of a Tracking Area Update if the UE is at a border region between tracking areas and the tracking area into which it is moving does not belong to the list of TAs the UE is registered with. In addition the adjustment of the cell selection/reselection parameters also improves both UE and Network performances in terms of UE battery consumption and paging failure rate.

In the case of intra LTE inter frequency cell selection/reselection, the UE, while in the idle state, makes measurement on Inter-frequency cells according to the inter-frequency cell reselection criteria broadcasted in BCH. Cell selection/reselection parameters for inter-frequency cell reselection are set in order to address signalling, processing and resource optimization. In addition the adjustment of the cell selection/reselection parameters also improves both UE and Network performances in terms of UE battery consumption and paging failure rate. The data reporting described above enables the cell selection reselection parameters to be adjusted so that they are properly set and may, when two inter-frequency cells overlap, avoid inter-frequency measurement and possible GAP activation being required upon detection of bad frequency quality by the UE (as soon as it enters the Active state) which could otherwise trigger Inter-frequency Handover and also a Tracking area update, if the UE is at Tracking Area border and the new Tracking area does not belong to the list of TAs the UE is registered with. The history data reporting described above also enables setting of the cell selection/reselection parameters to mirror the Operator strategy which may want most of the UEs accessing the network from one frequency so as to reserve other frequencies for other services.

In the case of Inter RAT cell selection/reselection, while in the idle state, the UE will make measurements on Inter-Rat cells according to the Inter-System cell reselection criteria broadcast in the BCH. Cell selection/reselection parameters for inter-RAT cell reselection are set in order to address signalling, processing and resource optimization. In addition the adjustment of the cell selection/reselection parameters also improves both UE and Network performances in terms of UE battery consumption and paging failure rate. The data reporting described above enables the cell selection reselection parameters to be adjusted so that they are properly set and may, when two inter-system cells overlap, avoid the need for Inter-system measurement and possible GAP activation upon detection of bad frequency quality by the UE as soon as the UE enters the Active state, thereby possibly avoiding triggering of Inter-system Handover and also possibly avoid a tracking area update, if the UE is at a tracking area/Routing Area border. The history data reporting described above also enables setting of the cell selection/reselection parameters to mirror Operator strategy which may want most of the UEs accessing the network to use a certain RAT rather than another one. In this case, the UE may also report the RAT and frequency information together with cell id and time.

Figure 5:
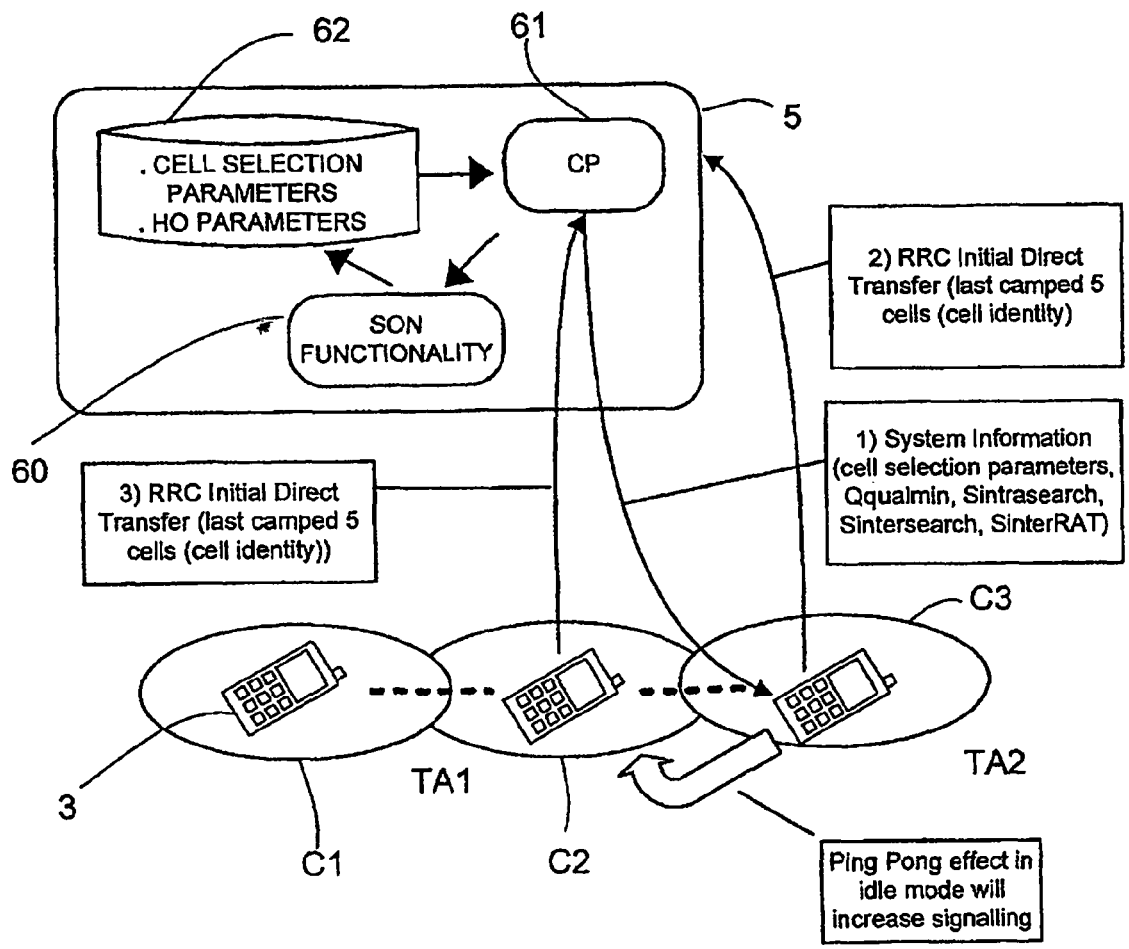
FIG. 5 shows a diagram to illustrate a first example of a method embodying the invention.
Figure 6:
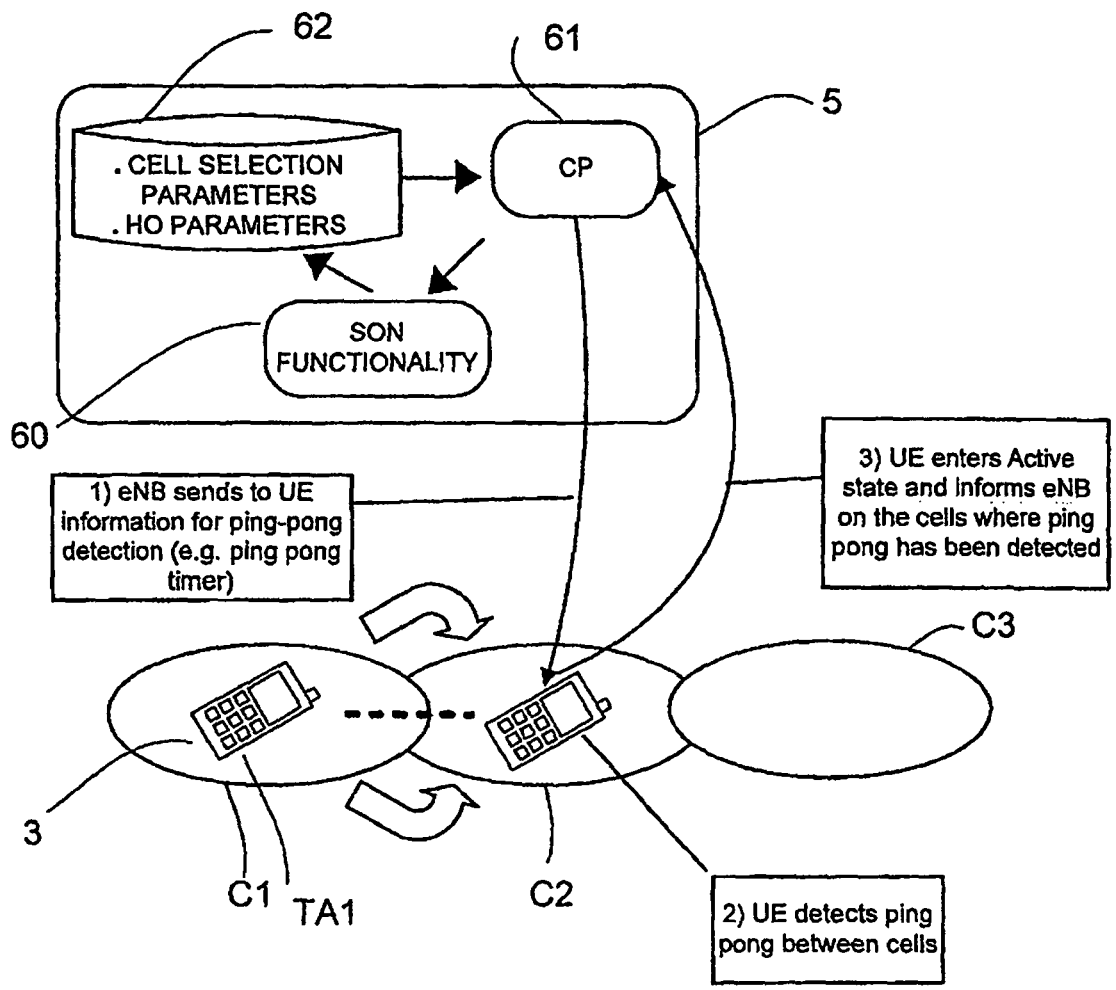
FIG. 6 shows a diagram to illustrate a second example of a method embodying the invention.
Figure 7:
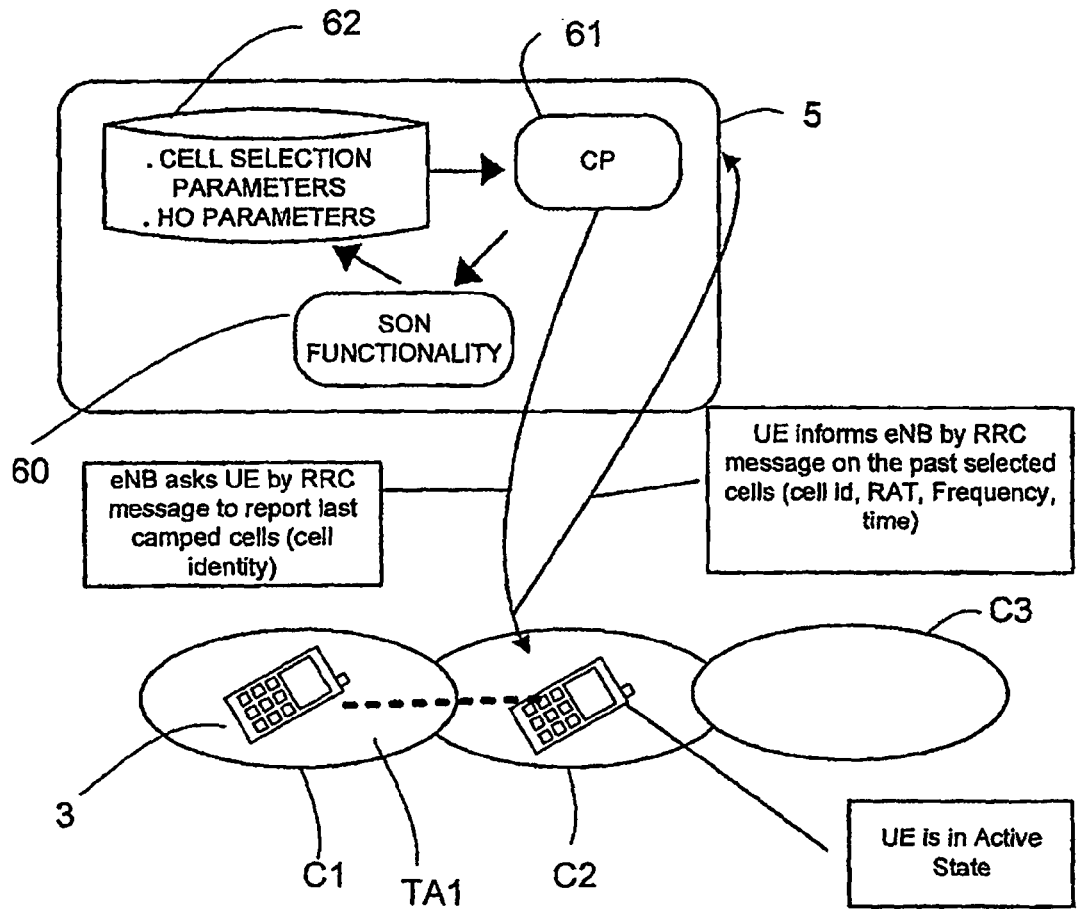
FIG. 7 shows a diagram to illustrate a third example of a method embodying the invention.

FIGS. 5 to 7 shows diagrams to illustrate examples of methods embodying of reporting history data to a base station. In FIGS. 5 to 7 the base station 5 is represented as having SON functionality 60, CP functionality 61 and a parameter controller which controls HO and cell selection parameters and so provides the cell selection parameter controller 53 of FIG. 4. In FIGS. 5 to 7 CP 61 provides the history data receiver of FIG. 4.

FIG. 5 shows a UE 3 passing through three neighbouring cells C1 to C3 of two neighbouring tracking areas TA1 and TA2. In the example shown in FIG. 5, the reporting of the history data is initiated by the UE 3. Thus, as shown in FIG. 5, the UE reports the history data (the identities of the past selected/reselected cells together with the time spent in each cell) when accessing the network and entering the active state. In the example illustrated, the UE reports the history data to the CP 61 in the RRC Initial Direct Transfer and any changes required to the cell selection/reselection parameters to avoid future ping pong are provided to the UE by the CP in the system information (which comprises cell selection parameters, Qqualmin, Sintrasearch, Sintersearch, SinterRat).

FIG. 6 shows a UE 3 passing between neighbouring cells C1 and C2 of a tracking area TA1. The reporting of the history data is again initiated by the UE 3. However, in this example, the UE is configured to detect ping pong in the history data in accordance with parameters sent by the base station (eNB) in the BCH channel (for example a ping pong timer) and on entering the active state to send a history data report to the base station identifying the cells concerned if it has detected ping pong between neighbouring cells.

In the UE-initiated examples of FIGS. 5 and 6, depending on the purpose of the ping-pong detection, the reporter of the UE may evaluate some conditions before sending a report to the base station. Thus, if, for example, the purpose of reporting the cell selection/reselection history is just to detect ping-pong between TAs, the checker 35 of the UE will check whether the TA of the cell in which the UE is camped is different from that of the last cell and only send a report if this is the case. Also, because ping pong may be caused by UE high Mobility (for example if the user is in a moving vehicle), the checker 35 of the UE may check whether it is in a high mobility state and may only send a report if it is not in a high Mobility condition so avoiding the possibility of cell selection/reselection parameters being adjusted when the ping pong is not due to the cell selection/reselection parameters.

FIG. 7 again shows a UE 3 passing between neighbouring cells C1 and C2 of a tracking area TA1. In this example, however, the history data reporting is initiated by the network. Thus in this example, the UE reports the cell selection/reselection history data whenever requested by the base station (eNB) when the UE is in the active state (so that it is reachable by the base station). Initiation by the base station has the advantage that the base station controls the amount of data collected and therefore the amount of signalling needed.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, the UEs are cellular telephones. Other communications nodes or devices may include user devices such as, for example, personal digital assistants, laptop computers, web browsers, etc.

Although as described above the base station provides the cell selection/reselection parameter data, this data may be provided by another network device or devices.

The present invention may be implemented in any communications system in which communications devices move between different cells or areas.

In the above embodiments, a number of software modules were described. As those skilled in the art will appreciate, the software modules may be provided in compiled or un-compiled form and may be supplied to the base station or to the UE as a signal over a computer network, or on a recording medium. Further, the functionality performed by part or all of this software may be performed using one or more dedicated hardware circuits. However, the use of software modules is preferred as it facilitates the updating of base station 5 and the UEs 3 in order to update their functionalities.

Various other modifications will be apparent to those skilled in the art and will not be described in further detail here.

Glossary of 3GPP Terms
UE—User Equipment—user communications device
RAT—Radio Access Technology
RAN—Radio Access Network
HO—Handover
FACH—Forward Access Channel
eNodeB, eNB—E-UTRAN Node B (evolved NodeB)
LTE—Long Term Evolution (of UTRAN)
UTRAN—UMTS Terrestrial Radio Access Network
UMTS—Universal Mobile Telecommunications System
MME—Mobility Management Entity
TA—Tracking Area
BCH—Broadcast Channel
GAP—Generic Access Profile
CP—Control Plane
RRC—Radio Resource Control
SON—Single Operational Node
RRM—Radio Resource Management
Qqualmin—minimum required quality level in cell The following is a detailed description of the way in which the present inventions may be implemented in the currently proposed 3GPP LTE standard. Whilst various features are described as being essential or necessary, this may only be the case for the proposed 3GPP LTE standard, for example due to other requirements imposed by the standard. These statements should not, therefore, be construed as limiting the present invention in any way.

Introduction

Current the ping pong detection issue has been analysed and solved for the UEs in Active Mode. However even for the idle mode UEs, ping pong effect can create some inefficiency in terms of signalling, processing and resources utilization. Also the ping-pong in idle mode may affect both UE and Network performance in terms of the UE battery consumption and the paging failure rate.

Purpose of this contribution is to discuss a mechanism which allows the eNB to detect ping pong during the following scenarios:
Intra LTE-Intra frequency cell selection/reselection
Intra LTE Inter frequency cell selection/reselection
Intersystem cell reselection Mainly the proposal consists in the UE reporting a list of the past cells where it was camped on whenever he is trying to connect to the network or it is requested by the eNB to do so.

It is left to the eNB implementation how to use the list of past selected cells.

Discussion

In LTE, the UE can either be in Active state or in idle state.

When being in Active state, the Handover procedure allows the UEs to have service continuity while moving within the Infra LTE system (Intra and Inter Frequency) and towards other RATs.

Mechanisms have been discussed and agreed in RAN3 in order to detect the ping pong effect when the UE is Active state. It is left to the implementation how to optimize the HO parameters once the ping pong has been detected.

In idle mode, the UE selects and reselects cells according to the parameters broadcasted in the BCH.

A wrong setting of the cell selection reselection parameters may cause the UE to ping pong between the cells which may be harmful in terms of both signalling, processing and resource utilization.

Furthermore, ping-pong in idle mode may cause:
Paging message to be lost during cell reselections, especially for inter-freq/inter-RAT case
Higher battery consumption in the UE because of repeated inter-freq/inter-RAT measurements
Service interruption if the ping-pong cause a cell selection procedure to be performed As a consequence it is important that the network is able to understand whether these parameters have been set properly.

In UMTS the network has the chance to monitor the cells the UE reselects since the cell selection/reselection procedure occurs also in connected mode (e.g. in cell FACH).

In LTE, when being in idle state, the eNB is unaware of the UE past selected cells and whether any ping pong occurs during cell selection-reselection.

The following paragraphs propose a method to detect the ping pong during cell reselection. The mechanism applies in the following scenarios:
Intra LTE Intra Frequency cell selection/reselection
Intra LTE Inter Frequency cell selection/reselection
Inter system cell selection/reselection 4.1. Intra LTE Intra Frequency Cell Selection/Reselection When the UE is in idle mode, the UE location is known at a Tracking Area granularity level. The UE, while moving, will reselect a new cell on the base of the cell reselection criteria broadcasted in the BCH channel.

If the cell selection/reselection parameters are not properly set, it may happen that a Handover procedure is performed as soon as the UE enters Active state. In addition a Tracking Area Update may be performed as well if the UE is at Tracking Area border and the new Tracking area does not belong to the list of TAs the UE is registered with.

Other performance issues as reported in the previous section may also occur. The proposal mainly consist on UEs keeping track of say last x cells it has camped on together with the time spent in each cell.

The UE will then send this list to the eNB either when entering Active state (UE Initiated) or when requested by the eNB (eNB Initiated).

4.2. Intra LTE Inter Frequency Cell Selection/Reselection

While the UE is in idle mode, it will make measurement on Inter-frequency cells according to the inter-frequency cell reselection criteria broadcasted in BCH.

Cell selection/reselection parameters for inter-frequency cell reselection are set in order to address signalling, processing and resource optimization. If for example, the parameters are not properly set when two inter-frequency cells overlap, it may happen that Inter-frequency measurement and possible GAP activation are needed upon detection of bad frequency quality by the UE when entering Active state.

As a consequence, Inter-frequency Handover may be triggered together with a Tracking area update if the UE is at Tracking Area border and the new Tracking area does not belong to the list of TAs the UE is registered with.

Furthermore the setting of the cell selection/reselection parameters has to mirror the Operator strategy which may want most of the UE accessing the network from one frequency and reserve other frequencies for other services.

In addition, if the ping pong occurs, other performance issues as reported in the previous chapter may occur.

In order for the eNB to detect the ping pong during inter-frequency cell reselection, the UE should send the eNB the list of the past selected cells together with the time spent either when entering Active state (UE Initiated) or when requested by the eNB (Network Initiated).

The UE may also report the frequency information together with cell id and time.

4.3. Inter RAT Cell Selection Reselection

While the UE is in idle mode, it will make measurement on Inter-Rat cells according to the Inter-System cell reselection criteria broadcasted in BCH.

If for example, the parameters are not properly set when two inter-system cells overlap, it may happen that Inter-system measurement and possible GAP activation are needed upon detection of bad frequency quality by the UE as soon as the UE enters the Active state.

As a consequence, Inter-system Handover may be triggered together with a Tracking area update if the UE is at Tracking Area border and the new Tracking area does not belong to the list of TAs the UE is registered with.

Furthermore the setting has to mirror the Operator strategy which may want most of the UE accessing the network using a certain RAT rather than another one.

In addition, if the ping pong occurs, other performance issues as reported in the previous chapter may occur.

In order for the eNB to detect the ping pong during the IRAT cell reselection, the UE should send the eNB the list of the past selected cells together with the time spent either when entering Active state (UE Initiated) or when requested by the eNB (Network Initiated).

The UE may also report the RAT and frequency information together with cell id and time.

4.4. Reporting Method

Figure 8A:
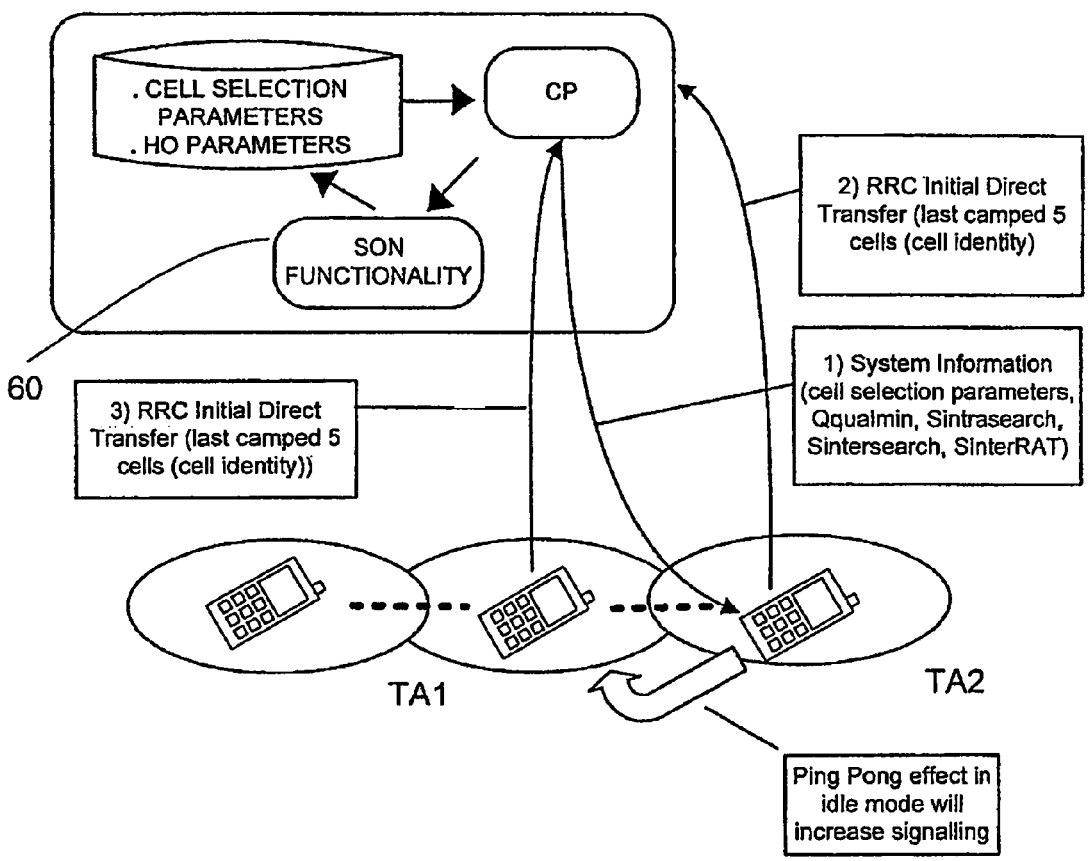
FIG. 8A shows a diagram to illustrate option 1 in which the present inventions may be implemented in the currently proposed 3GPP LTE standard.

Two methods of reporting are proposed in this contribution:

UE Initiated
OPTION 1 (FIG. 8A):
The UE reports the history of the past selected/reselected cells together with the time spent in each cell when accessing the network (e.g. in the RRC Initial Direct Transfer) and entering the Active State.

Figure 8B:
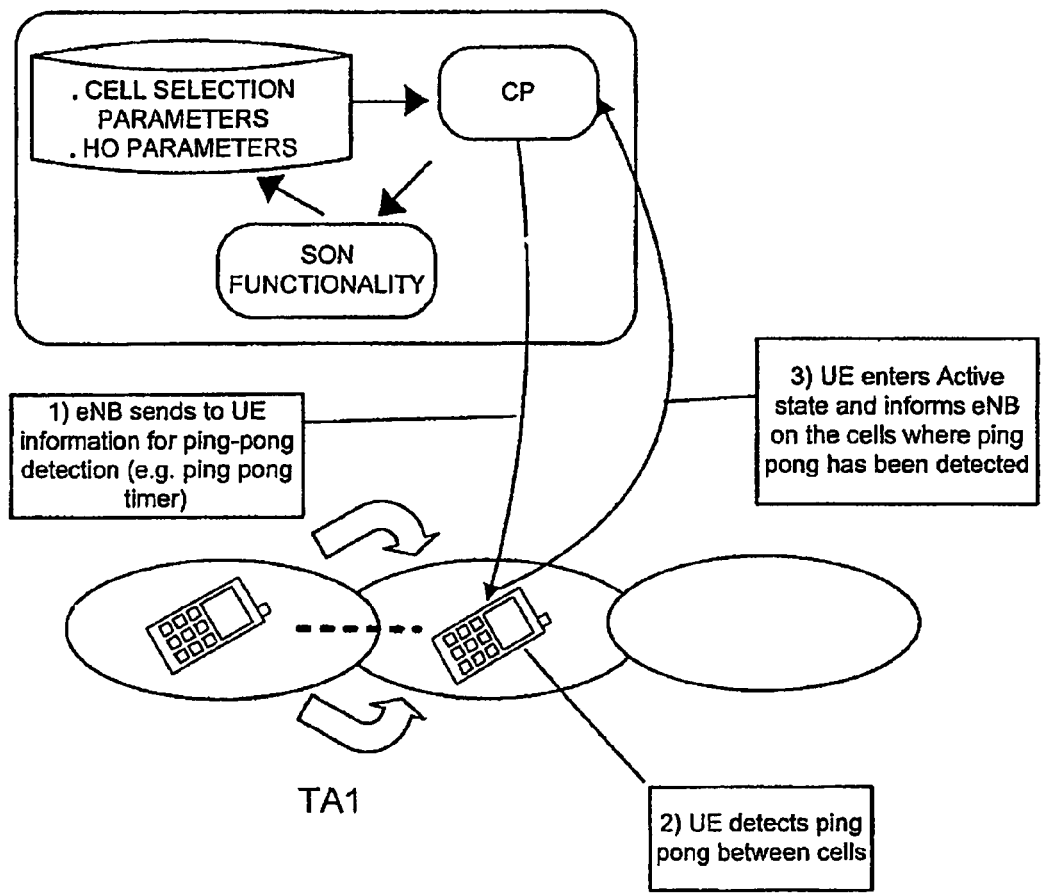
FIG. 8B shows a diagram to illustrate option 2 in which the present inventions may be implemented in the currently proposed 3GPP LTE standard.

OPTION 2 (FIG. 8B):
The UE sends a report to the eNB as soon as it detects ping pong between 2 cells
The ping pong detection is in line with parameters sent by the eNB in the BCH channel (e.g. ping pong timer)
In both Options, depending on the purpose of the ping-pong detection, the UE may evaluate some conditions before sending the Report to the eNB.
If for example, the purpose of receiving report of the past cells selected/reselected is just to detect ping-pong between TAs, the UE could check that the TA of the cell which the UE camped on to is different from the last cell.
Also it is important to be able to differentiate the ping pong due to wrong setting of cell selection/reselection parameters from the ping pong caused by the UE high Mobility. In order to do that, the UE could check whether he is in a high mobility state. The report will only be sent if the check is not verified.

Figure 8C:
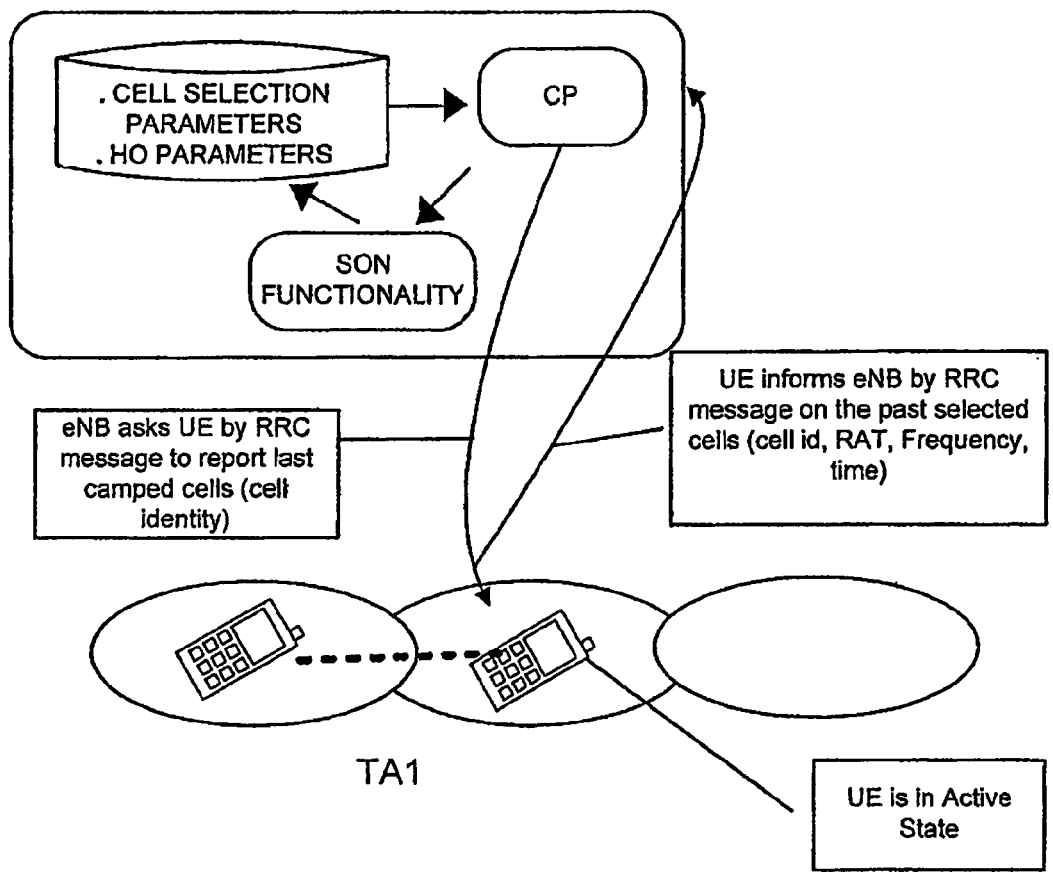
FIG. 8C shows a diagram to illustrate option 3 in which the present inventions may be implemented in the currently proposed 3GPP LTE standard.

Network Initiated:
Option 3 (FIG. 8C):
The UE reports the history of the cells selected/reselected together with the time spent in each cell whenever requested from the eNB. Obviously in this case the UE has to be in Active state in order to be reachable by the eNB. The main advantage of this option is that the eNB controls the amount of data to collects and therefore the amount of signalling needed.

CONCLUSION

In this contribution we propose a simple mechanism used to detect ping pong effect during Intra LTE cell selection reselection both Intra frequency and Inter frequency case and Inter RAT cell selection reselection.

The mechanism consist on UE tracking the last visited cells during idle state together with the time spent in each cell and informs the eNB either when entering Active state or when requested by the eNB.

It is proposed to discuss the contribute and agree on the proposed mechanism. NEC is available to prepare the necessary CRs against 36.300.

This application is based upon and claims the benefit of priority from United Kingdom patent application No. 0802021.6, filed on Feb. 4, 2008, the disclosure of which is incorporated herein in its entirety by reference.

The invention claimed is:

1. A method performed by a user communications device having active and idle states in a cellular communications network in which user communications devices communicate via network communications devices of cells of the network, the method comprising:
  in the user communications device:
    maintaining history data identifying a location of the user communications device while the user communications device is in the idle state, wherein the history data comprises data relating to at least one of cell selection and cell reselection; and
    providing data relating to the history data to a network communications device when the user communications device is in the active state,
  wherein in the active state, the user communications device includes a radio resource control (RRC) connection.

2. A method according to claim 1, wherein the history data includes an identification of cells in which the user communications device has been located while in the idle state.

3. A method according to claim 2, wherein the history data includes an identification of the last n cells in which the user communications device has been located while in the idle state.

4. A method according to claim 2, wherein the history data includes cell identification data and data identifying a time for which the user communications device was located in that cell while in the idle state.

5. A method according to claim 1, wherein the history data includes tracking area identity data.

6. A method according to claim 2, wherein the data relating to at least one of cell selection and cell reselection includes data relating to at least one of intra LTE intra frequency cell selection and intra LTE frequency cell reselection.

7. A method according to claim 2, wherein the data relating to at least one of cell selection and cell reselection includes data relating to at least one of intra LTE inter frequency cell selection and intra LTE inter frequency cell reselection.

8. A method according to claim 2, wherein the data relating to at least one of cell selection and cell reselection includes data relating to at least one of inter RAT cell selection and inter RAT cell reselection.

9. A method according to claim 2, wherein the history data comprises frequency information.

10. A method according to claim 8, wherein the history data comprises the RAT and frequency information.

11. A method according to claim 1, wherein providing data is initiated by the user communications device.

12. A method according to claim 11, further comprising initiating, by the user communications device, providing of data relating to the history data upon entry into the active state.

13. A method according to claim 12, further comprising initiating, by the user communications device, providing of data relating to the history data in an RRC initial direct transfer or any other RRC message involved in idle to Active transition.

14. A method according to claim 11, further comprising initiating, by the user communications device, providing of data relating to the history data in response to detection of an indication of ping pong between at least one of cells and tracking areas.

15. A method according to claim 14, wherein the data provided by the user communications device includes at least one of data identifying cells and tracking areas for which ping pong has occurred.

16. A method according to claim 15, wherein the data provided by the user communications device also comprises time information.

17. A method according to claim 11, further comprising carrying out, by the user communications device, checks before the providing the data.

18. A method according to claim 11, further comprising:
determining, by the user communications device, whether the user communications device is in a high mobility state before providing the data; and
providing, by the user communications device, the data if it is determined that the user communications device is not in a high mobility state.

19. A method according to claim 11, further comprising checking, by the user communications device, whether a tracking area of a cell in which the user communications device is present is different from a tracking area of a last cell in which the user communications device was present, before providing the data.

20. A method according to claim 19, further comprising providing, by the user communications device, the data only if the tracking area of the cell in which the user communications device is present is different from the tracking area of the last cell in which the user communications device was present.

21. A method according to claim 1, wherein the communications device provides data relating to the history data in response to a request from a network communication device.

22. A method according to claim 1, further comprising receiving, by the user communications device, a new set of at least one of cell selection parameters and cell reselection parameters from a network device in response to providing data relating to the history data that is indicative of ping pong between cells.

23. A method performed by a network communications device in a cellular communications network in which user communications devices having active and idle states communicate via network communications devices of cells of the network, the method comprising:
in the network communications device:
receiving, from a user communications device in the active state, data relating to history data, the history data identifying a location of the user communications device while the user communications device is in the idle state and comprising data related to at least one of cell selection and cell reselection; and
providing parameter data for at least one of cell selection and cell reselection when in the active state,
wherein in the active state, the user communications device includes a radio resource control (RRC) connection.

24. A method according to claim 23, wherein the network communications device provides the parameter data related for at least one of cell selection and cell reselection so that any of the user communications device in the same cell as the user communications device receives the same cell selection/reselection parameter data.

25. A method according to claim 23, further comprising analyzing, by the network communications device, data from other user communications device in a cell for which the the parameter data for at least one of cell selection and cell reselection are provided.

26. A method according to claim 23, further comprising providing, by the network communications device, modified parameter data for at least one of cell selection and cell reselection in response to the data relating to the history data indicative of ping pong between cells or tracking areas.

27. A method according to claim 23, wherein the history data includes an identification of cells in which the user communications device has been located while in the idle state.

28. A method according to claim 23, further comprising requesting, by the network communication device, a user communications device to provide data relating to the history data.

29. A user communications device having active and idle states for use in a cellular communications network in which user communications devices communicate via network communications devices of cells of the network, the user communications device comprising:
a memory device storing a set of instructions; and
one or more processors configured to execute the set of instructions to:

maintain history data identifying a location of the user communications device while the user communications device is in the idle state, wherein the history data comprises data relating to at least one of cell selection and cell reselection; and provide data relating to the history data to a network communications device when the user communications device is in the active state, wherein in the active state, the user communications device includes a radio resource control (RRC) connection.

30. A device according to claim 29, wherein the history data includes an identification of cells in which the user communications device has been located.

31. A device according to claim 29, wherein the data relating to at least one of cell selection and cell reselection includes data relating to at least one of intra LTE intra frequency cell selection and LTE intra frequency cell reselection.

32. A device according to claim 29, wherein the data relating to at least one of cell selection and cell reselection includes data related to at least one of intra LTE inter frequency cell selection and intra LTE inter frequency cell reselection.

33. A device according to claim 29, wherein the data relating to at least one of cell selection and cell reselection includes data relating to at least one of inter RAT cell selection an inter RAT cell reselection.

34. A device according to claim 29, wherein the one or more processors are configured to execute the set of instructions to initiate providing of the data.

35. A device according to claim 34, wherein the one or more processors are configured to execute the set of instructions to provide the data upon entry into the active state.

36. A device according to claim 34, wherein the one or more processors are further configured to execute the set of instructions to initiate providing of the data in response to detection of an indication of ping pong between at least one of cells and tracking areas.

37. A device according to claim 29, wherein the one or more processors are further configured to execute the set of instructions to initiate providing of the data in response to a request from a network communications device.

38. A device according to claim 34, wherein the one or more processors are further configured to execute the set of instructions to carry out checks before providing the data.

39. A network communications device for use in a cellular communications network in which user communications devices having active and idle states communicate via network communications devices of cells of the network, the network communications device comprising:

a memory device storing a set of instructions; and
one or more processors configured to execute the set of instructions to:
receive from a user communications device in the active state data relating to history data, the history data relating to a location of the user communications device while the user communications device is in the idle state; and
provide data related to parameters for at least one of cell selection and cell reselection when in the active state,
wherein in the active state, the user communications device includes a radio resource control (RRC) connection.

40. A network communications device for use in a cellular communications network in which user communications devices having active and idle states communicate via network communications devices of cells of the network, the network communications device comprising:

a memory device that stores a set of instructions; and
at least one controller configured to execute the set of instructions to:
receive from a user communications device in the active state data relating to history data, the history data relating to a location of the user communications device while the user communications device is in the idle state;
provide data related to parameters for at least one of cell selection and cell reselection when in the active state, the parameters being related to information about at least one of cell selection and cell reselection included in the history data,
wherein in the active state, the user communications device includes a radio resource control (RRC) connection.

41. A non-transitory computer readable medium storing a program that, when executed by a user communications device having active and idle states for use in a cellular communications network in which the user communications devices communicate with other user communications devices via network communications devices of cells of the network, causes the user communications device to perform a method, the method comprising:

maintaining history data identifying a cell location of the user communications device while the user communications device is in the idle state, wherein the history data comprises data relating to at least one of cell selection and cell reselection; and providing data relating to the history data to a network communications device when the user communications device is in the active state, wherein in the active state, the user communications device includes a radio resource control (RRC) connection.

42. A non-transitory computer readable medium storing a program that, when executed by a network communications device for use in a cellular communications network in which user communications devices having active and idle states communicate via the network communications device, causes the network communications device to perform a method, the method comprising:

receiving from a user communications device in the active state data relating to history data, the history data relating to a cell location of the user communications device while the user communications device is in the idle state, wherein the history data comprises data relating to at least one of cell selection and cell reselection; and providing the user communications device with data related to parameters for at least one of cell selection and cell reselection when in the active state, wherein in the active state, the user communications device includes a radio resource control (RRC) connection.

43. A non-transitory computer readable medium according to claim 42, wherein the program, when executed by the network communications device, causes the network communications device to provide the user communications device with parameter data, the parameters being related to information about at least one of cell selection and cell reselection included in the history data.

44. A method according to claim 1, wherein the history data comprises time information indicating a time to which said history data relates.

45. A method according to claim 23, wherein the history data comprises time information indicating a time to which said history data relates.

46. A device according to claim 29, wherein the history data comprises time information indicating a time to which said history data relates.

47. A device according to claim 39, wherein the history data comprises time information indicating a time to which said history data relates.

* * * * *